(12) United States Patent
Jarmay (10) Patent No.: US 9,666,241 B2
(45) Date of Patent: May 30, 2017

(54) FIRMWARE PROTECTION AND VALIDATION

(71) Applicant: QUIXANT PLC, Cambridgeshire (GB)

(72) Inventor: Nicholas Charles Leopold Jarmay, Chislehurst (GB)

(73) Assignee: QUIXANT PLC, Cambridgeshire (GB)

( * ) Notice: Subject to any disclaimer, the term of this patent is extended or adjusted under 35 U.S.C. 154(b) by 437 days.

(21) Appl. No.: 13/745,743

(22) Filed: Jan. 18, 2013

(65) Prior Publication Data

US 2013/0191624 A1 Jul. 25, 2013

Related U.S. Application Data (60) Provisional application No. 61/588,633, filed on Jan. 19, 2012.

(51) Int. Cl.

| G06F 9/00 | (2006.01) |
|---|---|
| G06F 15/177 | (2006.01) |
| G11C 5/14 | (2006.01) |
| G06F 9/44 | (2006.01) |
| G06F 12/14 | (2006.01) |

(52) U.S. Cl.
CPC ............. *G11C 5/14* (2013.01); *G06F 9/4401* (2013.01); *G06F 12/1433* (2013.01)

(58) Field of Classification Search
CPC ............................ G06F 9/4401; G06F 9/4406
USPC ............................................................ 713/2
See application file for complete search history.

(56) References Cited

U.S. PATENT DOCUMENTS

| 5,592,609 A | 1/1997 | Suzuki et al. |
|---|---|---|
| 5,599,231 A | 2/1997 | Hibino et al. |
| 5,680,533 A | 10/1997 | Yamato et al. |
| 5,680,534 A | 10/1997 | Yamato et al. |
| 5,724,549 A | 3/1998 | Selgas et al. |
| 5,845,332 A | 12/1998 | Inoue et al. |
| 5,881,002 A | 3/1999 | Hamakawa |
| 5,991,194 A | 11/1999 | Jigour et al. |
| 6,149,522 A | 11/2000 | Alcorn et al. |
| 6,379,252 B2 | 4/2002 | Takata et al. |
| 6,488,581 B1 | 12/2002 | Stockdale |
| 6,715,049 B1 | 3/2004 | Hayakashi |
| 6,875,109 B2 | 4/2005 | Stockdale |
| 6,963,501 B2 | 11/2005 | Shiga |
| 7,051,180 B2 | 5/2006 | Downer et al. |

(Continued)

FOREIGN PATENT DOCUMENTS

AU WO2005026951 A1 3/2005

*Primary Examiner* — Robert Cassity
(74) *Attorney, Agent, or Firm* — Kwan & Olynick LLP (57) ABSTRACT

A system for firmware protection and validation includes: a memory device, including firmware; a chipset, a microprocessor; a secure logic device in electrical communication with the chipset and the memory device; and a power on reset circuit in communication with the secure logic device, wherein, when the secure logic device receives a reset signal from the power on reset circuit, the secure logic device applies a hold signal to the chipset, when the hold signal is applied to the chipset, the power on reset circuit de-asserts the reset signal, when the reset signal is de-asserted, the secure logic device validates the content of the firmware in the memory device, and further wherein, when the content of the firmware is validated by the secure logic device, the secure logic device de-asserts the hold signal applied to the chipset.

21 Claims, 3 Drawing Sheets

(56) References Cited

U.S. PATENT DOCUMENTS

| | | |
|---|---|---|
| 7,093,091 B2 | 8/2006 | DeCaro |
| 7,108,605 B2 | 9/2006 | LeMay et al. |
| 7,137,893 B2 | 11/2006 | Canterbury |
| 7,275,128 B2 | 9/2007 | DeCaro |
| 7,325,114 B2 | 1/2008 | DeCaro |
| 7,398,348 B2 | 7/2008 | Moore et al. |
| 7,581,256 B2 | 8/2009 | Cockerille et al. |
| 7,689,805 B2 | 3/2010 | Moore et al. |
| 7,694,151 B1 | 4/2010 | Johnson et al. |
| 7,722,468 B2 | 5/2010 | Cockerille et al. |
| 7,736,234 B2 | 6/2010 | Cockerille et al. |
| 7,827,370 B2 | 11/2010 | Ahvenainen et al. |
| 7,861,058 B2 | 12/2010 | Moore et al. |
| 7,961,510 B2 | 6/2011 | Norman |
| 7,990,762 B2 | 8/2011 | Norman |
| 7,996,916 B2 | 8/2011 | Cockerille et al. |
| 2002/0004905 A1 | 1/2002 | Davis et al. |
| 2002/0166062 A1* | 11/2002 | Helbig, Sr. ............... 713/200 |
| 2003/0203755 A1 | 10/2003 | Jackson |
| 2004/0049645 A1 | 3/2004 | Lee et al. |
| 2004/0259633 A1 | 12/2004 | Gentles et al. |
| 2004/0259640 A1 | 12/2004 | Gentles et al. |
| 2004/0266523 A1 | 12/2004 | Gentles et al. |
| 2004/0266533 A1 | 12/2004 | Gentles et al. |
| 2006/0053246 A1 | 3/2006 | Lee |
| 2006/0205513 A1 | 9/2006 | Breckner et al. |
| 2006/0248267 A1 | 11/2006 | Xie |
| 2007/0004501 A1 | 1/2007 | Brewer et al. |
| 2007/0021195 A1 | 1/2007 | Campbell et al. |
| 2007/0180269 A1 | 8/2007 | Irish et al. |
| 2007/0300207 A1 | 12/2007 | Booth et al. |
| 2008/0045342 A1 | 2/2008 | Crowder et al. |
| 2008/0064501 A1 | 3/2008 | Patel |
| 2008/0182659 A1 | 7/2008 | Sabella et al. |
| 2008/0254850 A1 | 10/2008 | Sylla |
| 2009/0124374 A1 | 5/2009 | Patel |
| 2009/0124375 A1 | 5/2009 | Patel |
| 2009/0193230 A1* | 7/2009 | Findeisen ............ G06F 21/445 712/34 |
| 2009/0203430 A1 | 8/2009 | Peek |
| 2009/0204777 A1 | 8/2009 | Norman |
| 2009/0247293 A1* | 10/2009 | Lenger ............................. 463/29 |
| 2009/0280906 A1 | 11/2009 | Larsen et al. |
| 2009/0280907 A1 | 11/2009 | Larsen et al. |
| 2009/0327741 A1* | 12/2009 | Zimmer ................ G06F 21/575 713/183 |
| 2010/0041471 A1 | 2/2010 | Hamlin et al. |
| 2010/0048297 A1* | 2/2010 | Dasgupta ........................ 463/29 |
| 2010/0062844 A1 | 3/2010 | Crowder et al. |
| 2010/0075760 A1 | 3/2010 | Shimabukuro et al. |
| 2010/0120529 A1 | 5/2010 | Shimabukuro et al. |
| 2010/0235912 A1* | 9/2010 | Hermann et al. ............... 726/23 |
| 2010/0248816 A1 | 9/2010 | Liber et al. |
| 2011/0047416 A1 | 2/2011 | Moore et al. |
| 2011/0111865 A1 | 5/2011 | Cadima et al. |
| 2011/0115810 A1 | 5/2011 | Lawrence |
| 2011/0117994 A1 | 5/2011 | Harvey et al. |
| 2011/0118014 A1 | 5/2011 | Mitchell et al. |
| 2011/0118016 A1 | 5/2011 | Lawrence et al. |
| 2011/0131401 A1 | 6/2011 | Singh et al. |
| 2011/0131403 A1* | 6/2011 | Ibrahim et al. ................... 713/2 |
| 2012/0303941 A1* | 11/2012 | Grieco ................ G06F 21/76 713/2 |
| 2013/0013905 A1* | 1/2013 | Held et al. ......................... 713/2 |

\* cited by examiner

FIRMWARE PROTECTION AND VALIDATION

CROSS-REFERENCE TO RELATED APPLICATIONS

This application incorporates by reference and claims priority to U.S. Provisional Patent Application No. 61/588,633 filed Jan. 19, 2012.

BACKGROUND OF THE INVENTION

The present subject matter relates generally to systems and methods for securely validating and protecting firmware software while maintaining authorized reprogrammability of the firmware software. More specifically, the present subject matter provides systems and methods in which a secure logic device is inserted between a firmware device and a microprocessor-based system, wherein the secure logic device is responsible for validating the firmware in hardware logic before the microprocessor is allowed to start executing the firmware code.

There are many computer systems in which one or more firmware devices control various systems within the computer system. While there are nearly limitless variations of such systems and environments in which they are used, the disclosure provided herein discussed the subject matter in the context of gambling machines. While described in the gambling machine context, it is understood that the teachings provided herein are applicable to any system which incorporate one or more firmware devices with one or more processing devices.

Computer systems for use in gaming and gambling machines are often referred to as "slot machines." It is usually necessary for slot machines to comply with certain standards defined by government, state, or other regulatory bodies relating to the security of the slot machines, as they handle significant revenue streams. It is usual for there to be security requirements to ensure the machines are not tampered with, for example, to prevent manipulation of payouts to users or prevent tampering with the recording of transactions for the purpose of collecting government gaming taxes from machine operators. Of course, in other contexts, there may be additional or alternative regulatory security requirements.

Slot machine manufacturers also have a strong interest in security in order to protect their intellectual property and prevent cloning of their systems or designs and/or the use of legitimate machines outside of the agreed terms, for example installation of a newer game on a machine without payment. Again, in other contexts, there may be additional or alternative commercial security requirements.

As part of these security requirements (whether commercial or regulatory), it is usually necessary to be able to validate the various software modules associated with a slot machine in order to detect any attempt at tampering or unauthorized change and to prevent the machine from operating when any alteration is detected.

Presently implemented slot machine security is usually complex in nature and comprises many layers to increase the overall strength of the security measures. Virtually all modern slot machines are controlled by some form of computer system internal to the machine. Typically, these computer systems are architecturally compatible with the IBM PC standard.

In electronic systems using microprocessors, there is normally an initial piece of software that is responsible for configuring the hardware and setting up the basic functioning of the system when power is turned on. This form of software is generally referred to as "firmware" as it is generally not changed during system use and is usually stored in non-volatile memory devices so that it is present and available to be used as soon as a system is powered up. A given computer system (or peripheral device) may contain one or more processing devices, so there may be more than one set of firmware and one or more memory devices containing the firmware.

In slot machine based on PC architecture, the firmware for the main processor is referred to as a BIOS (Basic Input-Output System). When a computer system having a BIOS is powered on, the BIOS first configures the hardware and environment. Then, once the BIOS completes its configuration of the hardware and environment, the system "boots" a computer operating system (OS). Finally, the OS executes the game program, which will be responsible for the behavior of the slot machine.

Slot machine manufacturers often incorporate security features inside their game programs. However, these can be reverse-engineered or defeated if not supplemented by additional security measures. For example, it is common for the game program to be located on a different storage device to the OS. The OS is then configured such that it performs a verification of the game storage media before it executes any program contained on it. If this verification fails, then the system halts. This security feature prevents alteration of the media containing the game and potential modification or insertion of malicious software. However, this can be defeated if an attacker is able to modify the OS media and either remove or modify the software responsible for verifying the game media. Therefore, it is necessary to also verify the integrity of the OS media before it is booted. To do this, it is usual for the BIOS to verify the OS media before it attempts to boot the OS contained on it. Again, if a change is detected the system halts, preventing any unauthorized use.

Finally, it is further necessary to verify that the BIOS itself has not been altered in any way, for example to remove the verification of the OS media to allow the booting of altered software. As the BIOS is the first piece of software to be executed after the system is started up, there has been no alternative other than to modify the BIOS so that it performs a check on itself. There are several drawbacks to this approach.

First, any program that is responsible for validating itself is open to attack. If an attacker can identify the code that performs the self-validation, it is possible to alter or eliminate it and allow the execution of further unauthorized code, namely modified OS software and/or game software. Second, modifying a BIOS to add the code to verify itself is often a complex procedure, as BIOS software requires expert knowledge of computer hardware and low-level programming.

As can be understood from the explanation above, providing strong security to the computer system within a slot machine is a complex process and can be defeated by an attack on the lowest piece of software in the chain—the BIOS. Accordingly, there is a need for systems and methods to improve firmware security whilst providing a simple mechanism by which authorized updates to the BIOS can be performed.

BRIEF SUMMARY OF THE INVENTION

The present disclosure provides systems and methods to improve firmware security whilst providing a simple mechanism by which authorized updates to the firmware can be performed. Specifically, the present disclosure provides systems and methods in which a secure logic device is inserted between a firmware device and a microprocessor, wherein the secure logic device is responsible for validating the firmware in hardware logic before the microprocessor is allowed to start executing the firmware code.

As the solutions provided herein include a secure hardware solution, the solutions provide a significant increase in overall security of the whole system. Any change to the firmware software will be detected during the validation process and the computer system will be prevented from executing any software at all. Indeed, in preferred embodiments of the systems and methods provided herein, any detected change to the firmware software will prevent the computer system from being allowed to exit the hardware reset state. In addition, the secure logic device enables the computer system to utilize encryption mechanisms such that authorized updates of the firmware software are possible without the requirement to change the secure logic device.

As used herein, a "hardware reset state" may be any state in which affected hardware is prevented from operating, whether the rest state prevents powering up of the device, prevents the execution of code, or otherwise preventing operation of a hardware element.

A typical existing microprocessor system includes one or more power supplies adapted to power: a firmware memory device; one or more microprocessors; a chipset; and a power on reset (POR) logic circuit. The typical sequence of operation in such systems is as follows: (1) system power is applied; (2) the POR circuit keeps the microprocessor and chipset in a reset state by asserting a reset signal until the power supplies become stable; (3) once the power supplies are stable, the POR circuit de-asserts the reset signal to the microprocessor and chipset, typically after a small delay; and (4) once the reset signal is de-asserted, the chipset enables the microprocessor to fetch the BIOS software from the firmware memory device and continue with the normal boot process.

In the systems and methods provided herein, the typical existing microprocessor system is modified to include a secure logic device between the firmware memory device and the microprocessor. In one example, the secure logic device is a field programmable gate array (FPGA). An example sequence of such systems and methods is as follows: (1) system power is applied; (2) the POR circuit asserts a reset signal until the power supplies become stable, wherein the reset signal keeps the microprocessor, the chipset, and the FPGA, in a reset state; (3) once the power supplies are stable, the POR de-asserts the reset signal, typically after a small delay, activating the FPGA; while simultaneously the FPGA asserts a hold signal to the microprocessor and chipset to maintain these elements in a hardware reset state (4) the FPGA then validates the content of the BIOS in the firmware memory device while continuing to assert a hold signal to prevent the microprocessor and chipset from executing the BIOS software; then, if the contents of the BIOS are not validated, (5) the hold signal is maintained and the system is prevented from starting up; and, if the contents of the BIOS are properly validated, (6) the FPGA de-asserts the hold signal allowing the chipset and microprocessor to start loading the BIOS software from the firmware memory device and continue with the normal boot process.

There are numerous examples of how the FPGA may validate the BIOS. In one example, the FPGA performs a hash algorithm on the data to produce a calculated digest (CD) value, essentially a fingerprint of the BIOS data. Any change to the BIOS will result in a different CD value. The CD value is then compared to a stored digest (SD) value that has been previously calculated and stored in the FPGA. As described above, if the CD and SD values do not match, the FPGA maintains the hold signal to prevent the system from booting and maintain the system in a hardware reset state. Additional actions may be triggered when the CD and SD do not match. For example, an invalid CD may trigger warning lights, audible alarms, the sending of warning messages, etc.

As shown, the addition of the secure logic device (e.g., FPGA) greatly improves the security of the system by preventing the start-up of a system in which the firmware has been modified without authorization. This is particularly true in systems in which the firmware memory device also includes the codes and/or other security methods used to subsequently validate the other storage media.

In addition to the systems and methods described above, certain enhancements can be made to improve both to the overall security provided by the described system and the ease by which authorized changes can be made to the firmware memory device.

One consideration is where the SD value, used to make the comparison, is saved. A first place the SD value may be saved is inside the FPGA device. This is an easy way of guaranteeing security, as many FPGAs provide very secure methods of protecting their internal configuration data. However, storing the SD inside the FPGA has the disadvantage that it will need to be re-programmed every time the firmware is changed in order to update the SD value. It is also common for manufacturers to provide different firmware configurations for different customers, markets, languages etc. Accordingly, when the SD is stored within the FPGA, it may require creating and maintaining multiple FPGA configuration files and programming the correct version during the manufacturing process, which is not ideal.

An alternative is to save the SD value in an external memory device, possibly even within the firmware memory device itself in an otherwise unused location. This is convenient but once again leaves the system open to attack. An attacker could modify the firmware program and at the same time update the easily accessible SD stored in the external memory device so that it correctly matches the "hacked" firmware, hence defeating the security. To address this weakness it may be helpful to introduce a further step. Instead of storing the SD value in plain form, it is first encrypted utilizing a secret key. The SD value is then stored in the external memory device in its encrypted form. The matching decryption key is stored securely within the FPGA and the encrypted SD is decrypted inside the FPGA before it is compared with the CD value. Hence, an attacker would have to know the correct key in order to successfully modify the firmware. Providing that a secure encryption technique is used the system will now be secure. An attacker can change the firmware code and calculate the new digest value for this firmware code, but, as long as the encryption key is unknown, the attacker will be unable to correctly update the easily accessible encrypted SD value to successfully pass the hashing/decryption/comparison process that will be performed by the secure logic device. This embodiment of the systems and methods benefits from the security provided by the secure logic device and also provide flexibility in being able to use a single version of the secure logic device with numerous versions of firmware memory devices.

An example of such systems and methods may be implemented with the following steps and advantages: (1) the computer system manufacturer programs a secure logic device (for example, an FPGA) with the necessary logic and decryption key, the decryption key preferably being kept secret, known only to the computer system manufacturer; (2) the decryption key is constant, and so the configuration of the FPGA can be consistent across multiple BIOS versions and different customers, easing manufacturing complexity; (3) a BIOS binary file particular for a customer or certain configuration is created in the usual way, whether generated by the computer manufacturer, by the customer, or by another third party; (4) a utility program is used to calculate a hash (for example, an SHA, or secure hash algorithm) of the BIOS binary file to generate a digest value to be used as the SD; (5) the computer system manufacturer uses the secret encryption key to encrypt the SD to generate an encrypted stored digest (ESD); (6) the ESD is either combined with the system BIOS in an unused location and programmed into the firmware memory device or stored in another memory device elsewhere in the system.

Should it be desirable to prevent an attacker from being able to reverse engineer the firmware code, using the FPGA and decryption key principles provided above, it is further possible to implement a modified FPGA logic to perform a decryption procedure on the actual firmware as it is read from the firmware memory device before passing the decrypted value on to the system for execution. Such a method simply requires the firmware code to be encrypted after it has been created and before it is programmed into the firmware memory device. As the FPGA already possesses the necessary decryption logic to decrypt the ESD it requires little extra logic to use the same functionality to decrypt the firmware code itself.

In one example, a system for firmware protection and validation includes: a memory device, including firmware; a chipset, a microprocessor; a secure logic device in electrical communication with the chipset and the memory device; and a power on reset circuit in communication with the secure logic device, wherein, the secure logic device receives a reset signal from the power on reset circuit; the secure logic device applies a hold signal to the chipset and microprocessor maintaining the whole system in a hardware reset state; once the power supplies are stable, the power on reset circuit de-asserts the reset signal but the secure logic device continues to assert a hold signal to the microprocessor and chipset maintaining these elements in a hardware reset state; the secure logic device validates the content of the firmware in the memory device against a stored digest, and further wherein, when the content of the firmware is validated by the secure logic device, the secure logic device de-asserts the hold signal applied to the chipset and microprocessor enabling the microprocessor and chipset to start fetching the validated firmware software from the firmware memory device. In a preferred embodiment, the memory device and chipset are included in a slot machine operating using standard PC architecture. The firmware may be, for example, a BIOS. The secure logic device may be, for example, a field programmable gate array.

In certain embodiments, the firmware itself may be encrypted before being programmed into the firmware memory device. In these embodiments, the secure logic device validates the firmware software and decrypts it on the fly as it is requested by the microprocessor and chipset. The systems and methods provided herein verifying the lowest level code before the rest of the system comes online and the encryption/decryption of the comparison data may be part of that verification process.

In one embodiment, the secure logic device may store an encrypted digest value of the firmware internally. Alternatively, an encrypted digest value of the firmware may be stored in an additional memory device.

In certain embodiments of the system, the system may further include an alarm circuit in electrical communication with the secure logic device.

An example of a method of providing firmware protection and validation includes the steps of: providing a memory device, including firmware; a chipset, a microprocessor; a secure logic device in electrical communication with the chipset and the firmware memory device; and a power on reset circuit in communication with the secure logic device; applying a reset signal from the power on reset circuit to the secure logic device; the secure logic device asserting a hold signal to the chipset and microprocessor; the power on reset circuit de-asserting the reset signal to the secure logic device; validating the content of the firmware in the memory device by the secure logic device; and, after the secure logic device validates the content of the firmware, de-asserting the hold signal to the chipset and microprocessor. In some embodiments, the firmware includes a BIOS.

In some embodiments, the step of validating the content of the BIOS includes performing a hash algorithm on the present state of the BIOS to produce a calculated digest value and comparing the calculated digest value to a stored digest value. When the calculated digest value matches the stored digest value, the BIOS is validated. When the calculated digest value does not match the stored digest value, the method further includes the step of activating an alarm. The step of activating an alarm may include triggering a warning light, an audible alarm, a warning message, etc.

The stored digest value may be encrypted. In some embodiments, the stored digest value is stored in the secure logic device. In other embodiments, the stored digest value is stored in an additional memory device.

An advantage of the systems and methods provided herein is that they may make it significantly more difficult to tamper with firmware as a means to compromise the overall security of microprocessor based systems, for example in slot machines.

Another advantage of the systems and methods provided herein is that they provide a means of performing authorized re-programming of a memory device containing firmware each time a manufacturer wishes to legitimately change operating software in the memory device whilst maintaining a high degree of security from unauthorized re-programming.

Another advantage of the systems and methods provided herein is that they may be used to encrypt firmware to further protect a system from tampering or reverse engineering.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE INVENTION

Figure 1:
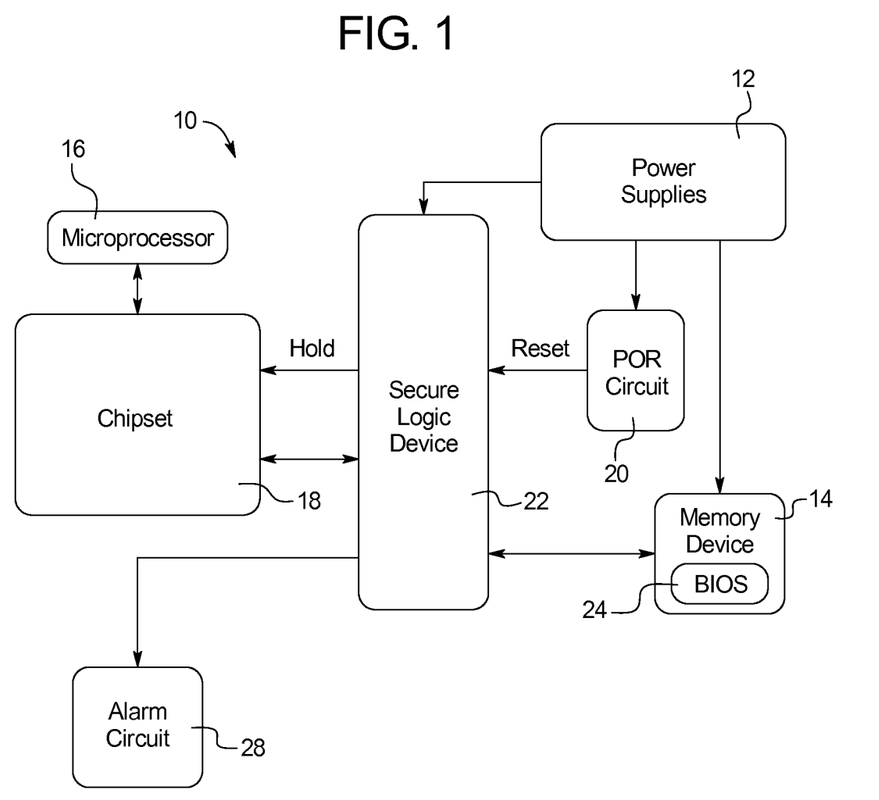
FIG. 1 is a schematic diagram of an embodiment of a system for firmware protection and validation.

FIG. 1 illustrates an example of an embodiment of a system for firmware protection and validation 10 (system 10). As shown in FIG. 1, the system 10 includes: one or more power supplies 12; a firmware memory device 14; one or more microprocessors 16; a chipset 18; a power on reset (POR) circuit 20; and a secure logic device 22. As will be described in further detail, the secure logic device 22 is responsible for validating firmware 24 stored in the firmware memory device 14 prior to the releasing the remaining elements of the system 10 from a hardware reset state.

The system 10 shown in FIG. 1 is adapted for use in a slot machine operating using standard PC architecture. However, it is understood that the disclosures provided herein will enable those skilled in the art to implement the system 10 within various microprocessor controlled systems to protect and validate firmware. Accordingly, while the examples provided herein are provided in the context of use in a slot machine, the application of the system 10 is known to be much more broadly applicable.

In the example provided in FIG. 1, a standard PC power supply 12 is adapted to provide power to each of the firmware memory device 14, the microprocessor 16, the chipset 18; the power on reset (POR) logic circuit 20; and the secure logic device 22. The firmware memory device 14 is a non-volatile memory device that stores firmware 24. In this example, the firmware 24 is a BIOS. The chipset 18 controls the communication between the firmware memory device 14 and the microprocessor 16. The secure logic device 22 is a field programmable gate array (FPGA), though in alternative embodiments, the secure logic device 22 may be another form of integrated circuit or other secure logic device. As shown, the POR circuit 20 controls a reset condition that prevents elements of the system from executing the firmware/BIOS, as described further herein.

In operation, the system 10 may perform as follows. First, system power is applied and the POR circuit 20 is energized by the power supply 12. The POR circuit 20 applies a reset signal to the secure logic device 22, which simultaneously applies a hold signal to the chipset and microprocessor until the power supply 12 is stable. Once the power supply 12 is stable and after a slight delay, the POR circuit 20 de-asserts the reset signal which releases the secure logic device 22 from a hardware reset state. The secure logic device continues to assert a hold signal to the rest of the system (except the memory device) to maintain it in a hardware reset state. The secure logic device 22 then validates the content of the BIOS 24 in the firmware memory device 14. If the contents of the BIOS 24 are not validated, the hold signal is maintained and the microprocessor 16 and the chipset 18 are maintained in a hardware reset state. Alternatively, if the contents of the BIOS 24 are properly validated, the secure logic device 22 de-asserts the hold signal allowing the microprocessor 16 and the chipset 18 to start loading the BIOS 24 from the firmware memory device 14 and continue with the normal boot process.

There are numerous examples through which the secure logic device 22 may be used to validate the BIOS 24. In one example, the secure logic device 22 performs a hash algorithm on the present state of the BIOS 24 to produce a calculated digest (CD) value, which is essentially a fingerprint of the current BIOS 24. Any change to the BIOS 24 results in a different CD value. The CD value is then compared to a stored digest (SD) value that has been previously calculated and stored in the secure logic device 22. If the CD and SD values do not match, the BIOS 24 has been altered. In such a case, the secure logic device 22 maintains the hold signal to prevent the microprocessor 16 and chipset 18 from leaving a hardware reset state. Additional actions may be triggered when the CD and SD do not match. For example, an invalid CD may trigger warning lights, audible alarms, the sending of warning messages, etc. in an associated alarm circuit 28. The secure logic device 12 may communicate with the alarm circuit 28.

As shown, the addition of the secure logic device 22 (e.g., FPGA) greatly improves the security of the system 10 by preventing the start-up of a system 10 in which the firmware 24 has been modified without authorization. The security of the system 10 is even further enhanced in systems 10 in which the firmware memory device 14 also includes the codes and/or other security methods used to subsequently validate any other storage media in the system 10.

In addition to the systems and methods described above, certain enhancements can be made to improve both to the overall security provided by the described system 10 and the ease by which authorized changes can be made to the firmware memory device 14.

One consideration is where the SD value, used to make the comparison, is saved. A first place the SD value may be saved is inside the secure logic device 22. This is an easy way of guaranteeing security, as many secure logic devices 22 provide very secure methods of protecting their internal configuration data. However, storing the SD inside the secure logic device 22 has the disadvantage that it will need to be re-programmed every time the firmware 24 is changed in order to update the SD value. It is also common for manufacturers to provide different firmware 24 for different customers, markets, languages etc. Accordingly, when the SD is stored within the secure logic device 22, it may require creating and maintaining multiple secure logic device 22 configuration files and programming the correct version during the manufacturing process, which is not ideal.

An alternative is to save the SD value in a memory device, whether an additional memory device or possibly even within the firmware memory device 14 itself in an otherwise unused location. This is convenient but once again leaves the system 10 open to attack. An attacker can modify the firmware 24 and at the same time update the easily accessible SD stored in the memory device so that it correctly matches the "hacked" firmware 24, hence defeating the security. To address this weakness, it may be helpful to introduce a further step. Instead of storing the SD value in plain form, it is first encrypted utilizing a secret key. The SD value is then stored in the memory device in its encrypted form. The matching decryption key is stored securely within the secure logic device 22 and the encrypted SD is decrypted inside the secure logic device 22 before it is compared with the CD value. Hence, an attacker would have to know the correct key in order to successfully modify the firmware 24. Providing that a secure encryption technique is used the system 10 will now be secure. An attacker can change the firmware 24 and calculate the new digest value for this firmware 24, but, as long as the encryption key is unknown, the attacker will be unable to correctly update the easily accessible encrypted SD value to successfully pass the hashing/decryption/comparison process that will be performed by the secure logic device 22. This embodiment of the system 10 benefits from the security provided by the secure logic device 22 and also provides flexibility in being able to use a single version of the secure logic device 22 with numerous versions of firmware memory devices 14.

Figure 2:
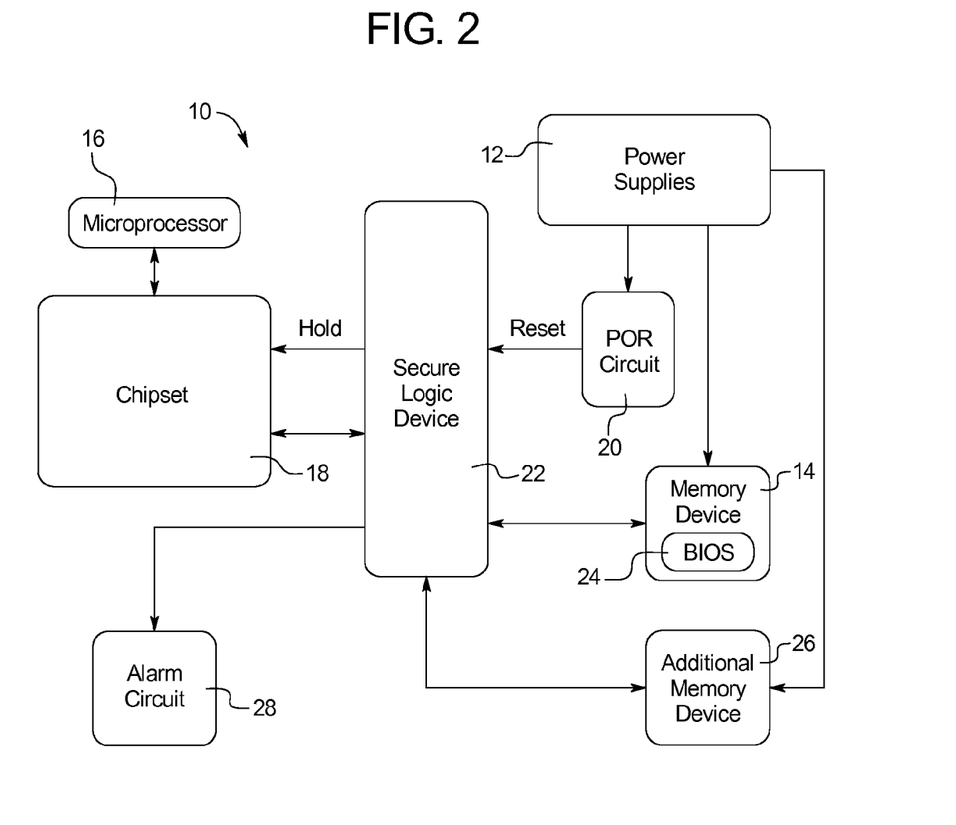
FIG. 2 is a schematic diagram of an embodiment of a system for firmware protection and validation.

An example of this alternative embodiment of the system 10 is provided in FIG. 2. As shown in FIG. 2, an additional memory device 26 is provided for storing an encrypted SD value. However, it is understood that the encrypted SD value may be stored in the firmware memory device 14 itself in an otherwise unused location.

In the example shown in FIG. 2, the secure logic device 22 (for example, an FPGA) is programmed with the necessary logic and a decryption key. The decryption key is preferably kept secret, known only to the manufacturer of the system 10. If the decryption key is held constant across numerous versions of the system 10, the configuration of the secure logic device 22 can be consistent across the versions of the system 10, for example, across multiple BIOS 24 versions. A hash of the specific BIOS 24 employed in the system 10 is created, for example, using a secure hash algorithm, to generate a digest value to be used as the SD. The SD is then encrypted using the secret encryption key to generate an encrypted stored digest (ESD). The ESD is stored in the additional memory device 26. Upon system startup, the secure logic device 22 validates the BIOS 24 against the decrypted ESD before determining whether to de-assert the hold signal and allow the microprocessor 16 and chipset 18 to exit the hardware reset state and load the BIOS software.

Figure 3:
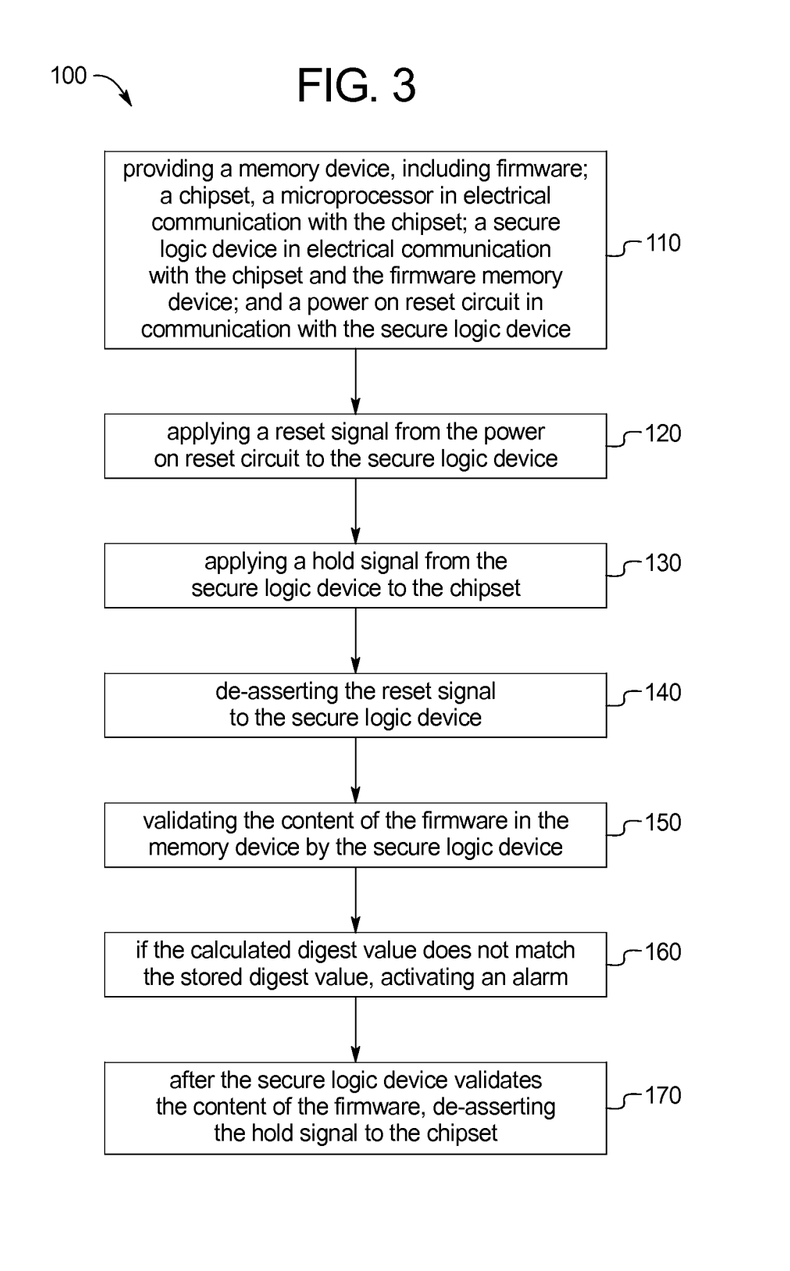
FIG. 3 is a flow chart depicting a method of providing firmware protection and validation.

Further, the secure logic device 22 may be adapted to perform a decryption procedure on the firmware 24 as it is read from the firmware memory device 14 before passing the decrypted value on to the microprocessor 16 for execution. Such a method simply requires the firmware 24 to be encrypted after it has been created and before it is programmed into the firmware memory device 14. As the secure logic device 22 may already possess the necessary decryption logic to decrypt the ESD, the secure logic device 22 requires little extra logic to use the same functionality to decrypt the firmware 24 itself. Turning now to FIG. 3, a method of providing firmware protection and validation 100 is illustrated. As shown, the method 100 includes the steps of: providing a memory device 14, including firmware 24; a chipset 18, a microprocessor 16; a secure logic device 22 in electrical communication with the chipset 18 and the memory device 14; and a power on reset circuit 20 in communication with the secure logic device 22 (step 110); applying a reset signal from the power on reset circuit 20 to the secure logic device 22 (step 120); applying a hold signal from the secure logic device 22 to the chipset 18 (step 130); de-asserting the reset signal to the secure logic device 22 (step 140); validating the content of the firmware 24 in the memory device 14 by the secure logic device 22 (step 150); if the calculated digest value does not match the stored digest value, activating an alarm 28 (step 160); and, if the secure logic device 22 validates the content of the firmware 24, de-asserting the hold signal to the chipset 18 (step 170). The step of activating an alarm 24 (step 160) may include triggering a warning light, an audible alarm, a warning message, etc.

In some embodiments of the method 100 shown in FIG. 3, the firmware 24 includes a BIOS 24. In such embodiments, the step of validating the content of the BIOS 24 may include performing a hash algorithm on the present state of the BIOS 24 to produce a calculated digest value and comparing the calculated digest value to a stored digest value. In such embodiments, when the calculated digest value matches the stored digest value, the BIOS 24 is validated. The stored digest value may be encrypted. In some embodiments, the encrypted stored digest value is stored in the secure logic device 22. In other embodiments, the encrypted stored digest value is stored in an additional memory device 26, which may include storage in an otherwise unused location in the firmware memory device 14.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A system for firmware protection and validation comprising:
   a memory device, including BIOS firmware;
   a chipset wherein the chipset controls communication between the memory device and the microprocessor including allowing the microprocessor to load and execute the BIOS firmware;
   the microprocessor in electrical communication with the chipset;
   a secure logic device in electrical communication with the chipset and the memory device wherein, prior to validation of the BIOS firmware, the secure logic device prevents the microprocessor from operating including executing instructions; and
   a power on reset circuit in communication with the secure logic device, wherein, when the secure logic device receives a reset signal from the power on reset circuit, the secure logic device applies a hold signal to the chipset and the microprocessor, wherein the secure logic device applies a hold signal to the microprocessor through the chipset, while the hold signal is applied to the chipset by the secure logic device, the power on reset circuit de-asserts the reset signal, when the reset signal is de-asserted, only the secure logic device validates the content of the firmware in the memory device, and further wherein, when the content of the firmware is validated by the secure logic device, the secure logic device de-asserts the hold signal applied to the chipset, further wherein the hold signal is continuously asserted from the receipt of the reset signal until the content of the firmware in the memory device is validated.

2. The system of claim 1 wherein the memory device and chipset are included in a slot machine.

3. The system of claim 2 wherein the chipset operates using standard PC architecture.

4. The system of claim 1 wherein the secure logic device is a field programmable gate array.

5. The system of claim 1 wherein the secure logic device stores a digest value of the firmware.

6. The system of claim 1 further including an additional memory device in electrical communication with the secure logic device, wherein the additional memory device stores an encrypted digest value of the firmware.

7. The system of claim 1 further including an alarm circuit in electrical communication with the secure logic device.

8. The system of claim 1, wherein the secure logic device is disposed on a communication path between the memory device and the microprocessor such that the logic device receives the BIOS firmware and passes it to the microprocessor.

9. The system of claim 8, wherein the BIOS firmware is encrypted and wherein the secure logic device is configured to decrypt the BIOS firmware prior to passing it to the microprocessor.

10. A method of providing firmware protection and validation comprising the steps of:
providing a memory device, including BIOS firmware; a chipset, a microprocessor in electrical communication with the chipset; a secure logic device in electrical communication with the chipset and the firmware memory device; and a power on reset circuit in communication with the secure logic device;
applying a reset signal from the power on reset circuit to the secure logic device;
applying a hold signal from the secure logic device to the chipset and the microprocessor, wherein the secure logic device applies a hold signal to the microprocessor through the chipset;
de-asserting the reset signal to the secure logic device;
validating the content of the firmware in the memory device by only the secure logic device, wherein the hold signal is continuously asserted from the receipt of the reset signal until the content of the firmware in the memory device is validated wherein the hold signal prevents the microprocessor from operating including executing instructions; and
after the secure logic device validates the content of the firmware, de-asserting the hold signal to the chipset wherein the chipset controls communication between the memory device and the microprocessor including allowing the microprocessor to load and execute the BIOS firmware.

11. The method of claim 10 wherein the step of validating the content of the BIOS includes performing a hash algorithm on the present state of the BIOS to produce a calculated digest value and comparing the calculated digest value to a stored digest value.

12. The method of claim 11 wherein, when the calculated digest value matches the stored digest value, the BIOS is validated.

13. The method of claim 11 wherein, when the calculated digest value does not match the stored digest value, the method further includes the step of activating an alarm.

14. The method of claim 13 wherein the step of activating an alarm includes triggering a warning light.

15. The method of claim 13 wherein the step of activating an alarm includes triggering an audible alarm.

16. The method of claim 13 wherein the step of activating an alarm includes triggering a warning message.

17. The method of claim 11 wherein the stored digest value is encrypted.

18. The method of claim 17 wherein the stored digest value is stored in the secure logic device.

19. The method of claim 17 wherein the stored digest value is stored in an additional memory device.

20. A system for firmware protection and validation comprising:
a BIOS firmware;
a chipset wherein the chipset controls communications which allow the microprocessor to load and execute the BIOS firmware;
a microprocessor in electrical communication with the chipset;
a secure logic device in electrical communication with the chipset, the microprocessor, and BIOS firmware wherein, prior to validation of the BIOS firmware, the secure logic device prevents the microprocessor from operating including executing instructions; and
a power on reset circuit in communication with the secure logic device, wherein,
when the secure logic device receives a reset signal from the power on reset circuit, the secure logic device asserts a hold signal to the microprocessor,
when the power on reset circuit de-asserts the reset signal to the secure logic device, only the secure logic device validates the content of the BIOS firmware, wherein the hold signal is continuously applied from the receipt of the de-assertion of the reset signal until the content of the BIOS firmware in the memory device is validated.

21. The system of claim 20, wherein the secure logic device stores a digest value of the firmware, wherein the secure logic device validates the content of the BIOS firmware by performing a hash algorithm on the content of the BIOS firmware to produce a calculated digest value and comparing the calculated digest value to the stored digest value.

* * * * *

UNITED STATES PATENT AND TRADEMARK OFFICE
CERTIFICATE OF CORRECTION

| | | |
|---|---|---|
| PATENT NO. | : 9,666,241 B2 | Page 1 of 1 |
| APPLICATION NO. | : 13/745743 | |
| DATED | : May 30, 2017 | |
| INVENTOR(S) | : Nicholas Charles Leopold Jarmany | |

It is certified that error appears in the above-identified patent and that said Letters Patent is hereby corrected as shown below:

On the Title Page

Item (72) Inventor should read: "Nicholas Charles Leopold Jarmany, Chislehurst (GB)"

Signed and Sealed this
Eighth Day of August, 2017

Joseph Matal
*Performing the Functions and Duties of the*
*Under Secretary of Commerce for Intellectual Property and*
*Director of the United States Patent and Trademark Office*